(12) United States Patent
Mews et al.

(10) Patent No.: US 11,416,223 B2
(45) Date of Patent: Aug. 16, 2022

(54) SYSTEM FOR IMPLEMENTING DYNAMIC PAYMENTS CATALOG

(71) Applicant: PayPal, Inc., San Jose, CA (US)

(72) Inventors: Willian Mews, Vancouver (CA); Blair Michael Olynyk, Maple Ridge (CA); Willem Hermanus Georgius Hersbach, Vancouver (CA)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/536,703

(22) Filed: Aug. 9, 2019

(65) Prior Publication Data

US 2021/0042092 A1 Feb. 11, 2021

(51) Int. Cl.
  *G06Q 20/00* (2012.01)
  *G06F 8/34* (2018.01)
  *G06F 8/10* (2018.01)
  *G06F 8/38* (2018.01)

(52) U.S. Cl.
  CPC ............... *G06F 8/34* (2013.01); *G06F 8/10* (2013.01); *G06F 8/38* (2013.01)

(58) Field of Classification Search
  CPC ..... G06F 8/34; G06F 8/10; G06F 8/38; G06F 9/451; G06F 3/0482; G06Q 10/00; G06Q 20/00; H04Q 5/00
  See application file for complete search history.

(56) References Cited

U.S. PATENT DOCUMENTS

| | | | |
|---|---|---|---|
| 10,268,991 B1* | 4/2019 | Davison | G06Q 20/00 |
| 2001/0037204 A1* | 11/2001 | Horn | G06Q 30/02 705/309 |
| 2009/0019313 A1* | 1/2009 | Pokala | G06F 9/451 714/37 |
| 2012/0272221 A1* | 10/2012 | Pessoa | G06F 9/4492 717/127 |
| 2013/0204879 A1* | 8/2013 | Zeng | G06F 16/22 707/747 |
| 2014/0145866 A1* | 5/2014 | Lee | H03M 7/6088 341/87 |
| 2016/0132805 A1* | 5/2016 | Delacourt | G06F 8/71 705/7.23 |
| 2017/0034082 A1* | 2/2017 | Pfaff | G06F 16/9535 |
| 2019/0095989 A1* | 3/2019 | Archer | G06Q 20/385 |
| 2019/0179648 A1* | 6/2019 | Kevorkian | G06F 9/451 |
| 2019/0228357 A1* | 7/2019 | Fisher | G06N 7/005 |
| 2020/0264766 A1* | 8/2020 | Hameed | G06F 3/04847 |
| 2020/0311192 A1* | 10/2020 | Kumar | G06K 9/00449 |
| 2020/0372755 A1* | 11/2020 | Shepherd | G06Q 20/367 |

\* cited by examiner

*Primary Examiner* — Chat C Do
*Assistant Examiner* — Noor Alkhateeb

(57) ABSTRACT

A system and method for implementing a dynamic payments catalog is described. A set of processors that satisfy a set of requirements is identified. Required fields for each of the set of processors are further identified. Valid values for each of the required fields identified are determined. A dynamic payments catalog is built based on the identified required fields and valid values. Access to the dynamic payments catalog is then provided to clients.

20 Claims, 4 Drawing Sheets

Figure 4a                    Figure 4b

SYSTEM FOR IMPLEMENTING DYNAMIC PAYMENTS CATALOG

TECHNICAL FIELD

The subject technology generally relates to data catalogs and more particularly, relates to a system and method for implementing dynamic payment catalogs on client sites.

BACKGROUND

In order to improve implementation of payments catalogs on a client's website, a number of different protocols may be used. One of the more common ones is the representational state transfer (REST) API. REST APIs are used so that user interface (UI) concerns may be separated from data storage concerns, thereby improving the portability of the user interface across multiple platforms. However, the adoption by more clients creates a need for more configuration information. Thus, when a large number of clients are integrated, the footprint of the integrator's code base gets unmanageably large over time.

One way to address this footprint issue is to break TM communicator (TMC) configuration into more consumable data. For example, given a specific UI state context, additional endpoints or additional query parameters may be created in order to serve a data set that represents a context at a specific time. This approach, however, requires more developer resources and opening up more REST APIs. While adding more REST APIs may be helpful, this solution goes against the need for faster integration, faster API throughput, and serving additional UI integration with the API in the future. As such, there's a need for an application that addresses all the above-described issues in a manner that doesn't cause an excessive amount of detriment to a system.

SUMMARY

According to various aspects of the subject technology, a system for implementing a dynamic payments catalog. A set of processors that satisfy a set of requirements is identified. Required fields for each of the set of processors are further identified. Valid values for each of the required fields identified are determined. A dynamic payments catalog is built based on the identified required fields and valid values. Access to the dynamic payments catalog is then provided to clients.

According to various aspects of the subject technology, a method for implementing a dynamic payments catalog. A set of processors that satisfy a set of requirements is identified. Required fields for each of the set of processors are further identified. Valid values for each of the required fields identified are determined. A dynamic payments catalog is built based on the identified required fields and valid values. Access to the dynamic payments catalog is then provided to clients.

According to various aspects of the subject technology, a non-transitory machine-readable medium having stored thereon machine-readable instructions executable for implementing a dynamic payments catalog. A set of processors that satisfy a set of requirements is identified. Required fields for each of the set of processors are further identified. Valid values for each of the required fields identified are determined. A dynamic payments catalog is built based on the identified required fields and valid values. Access to the dynamic payments catalog is then provided to clients.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIGS. 4a and 4b provide example graphical depictions of a dynamic payments catalogs that have been implemented on the client side.

DETAILED DESCRIPTION

Different merchants provide different UIs for their customers to interact with the merchant's web site. In most instances, merchants in the same or similar verticals may need to capture similar information to complete transactions. In a simple example, merchants that sell products online typically require billing and shipping information from their customers. Such information may include a name, and address (e.g., street number, street name, unit number, city, state and zip code), phone number, email, etc. Some of this information may be interrelated, such as state and zip code.

Such variations present an interesting problem to software developers that design the underlying applications on top of which these merchants operate their websites. The variation in the type of information collected requires some amount of flexibility and dynamism of the software if the developer wishes to not have to write unique code for each variation. For example, information collected by a merchant or a transaction consummated in Europe may differ from that which is collected by a merchant for a transaction in the United States. While some of the information may be the same, other information formats and requirements may differ (e.g., currency, address format, name format, language, etc.).

Thus, in order to better serve the needs of a broad range of merchant clients operating around different regions of the world and operating across different types of businesses, a more sophisticated payments catalog solution is needed. By using a query language for APIs such as GraphQL, and using a server-side runtime for executing queries utilizing a type system, customized data may be defined. In this example, since GraphQL isn't tied to a specific database or storage engine, its queries may be backed by existing code and data and thus not require drastically different implementation.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
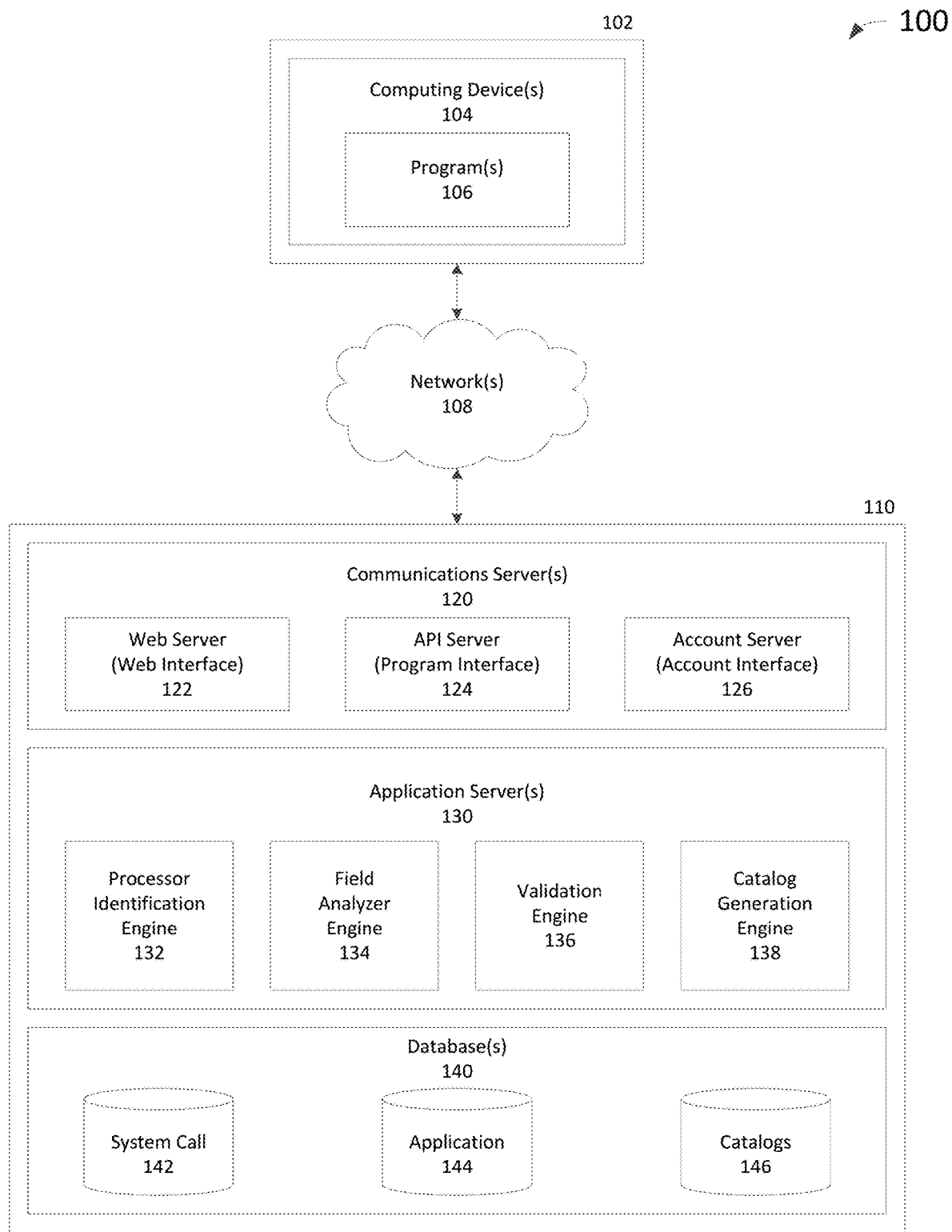
FIG. 1 is a block diagram of an exemplary computing system on which the implementing a dynamic payments catalog may be performed.

FIG. 1 is a block diagram of an exemplary computing system on which the implementation of a dynamic payments catalog may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services such as tools for verifying URLs based on information collected about customers. Application servers 130 may include multiple servers and/or components. For example, application servers 130 may include a processor identification engine 132, field analyzer engine 134, validation engine 136, and/or catalog generation 138. These servers and/or components, which may be in addition to other servers, may be structured and arranged to implement dynamic payments catalogs.

Application servers 130, in turn, may be coupled to and capable of accessing one or more databases 140 including system call database 142, application database 144, and/or Catalog database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
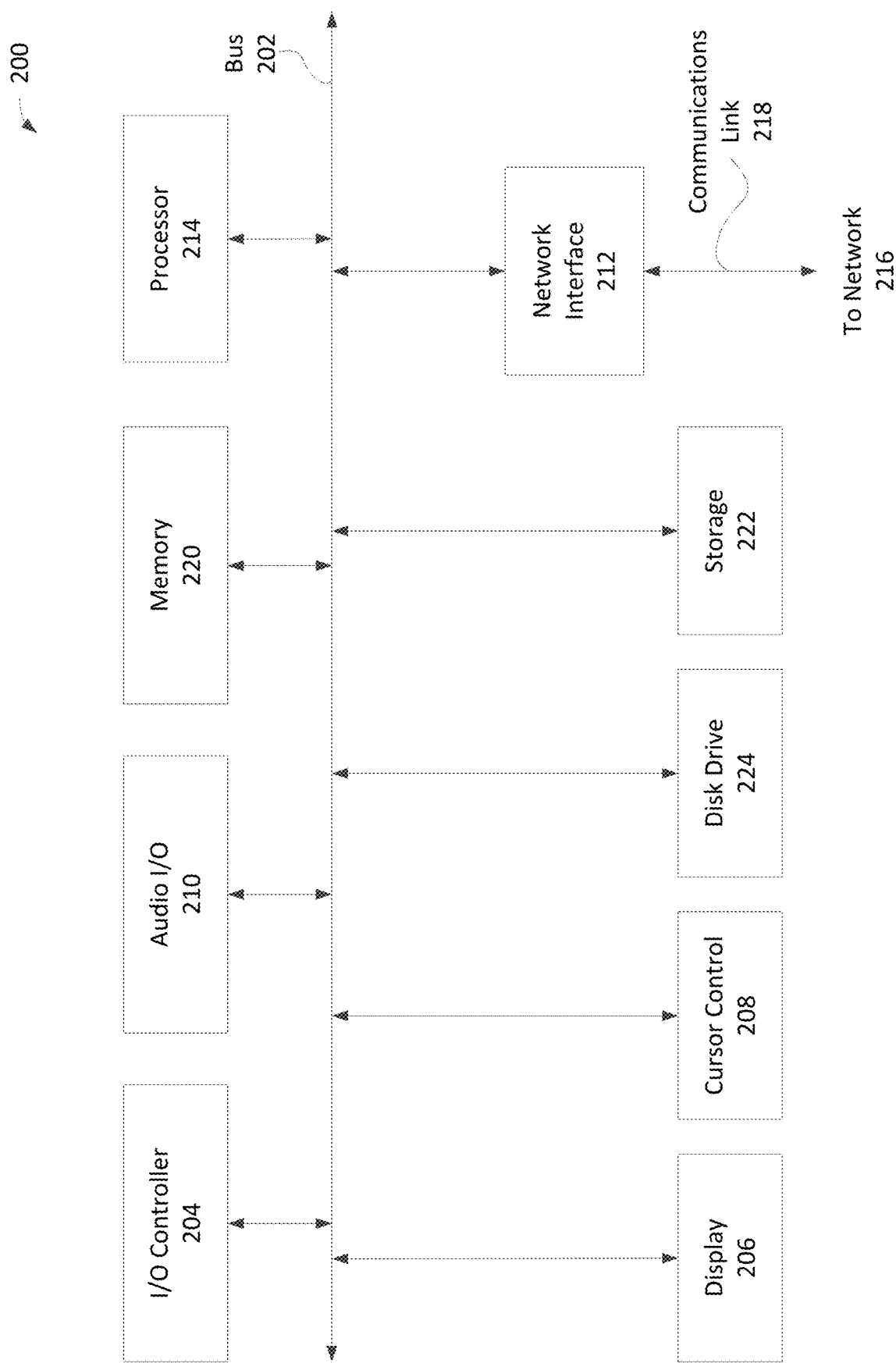
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

While different merchants may use different UIs for their customers to interact with the merchants' online marketplace, many of these UIs process substantially the same type of information, especially if the merchants are in the same or similar verticals. For example, financial institutions require much of the same information from their customers (e.g., name, address, phone number, email, social security number, etc.) when maintaining an account on behalf of the customer. However, the amount information required and the format of such information, may vary depending on location of the financial institution and/or the customer. Additionally, some of the information may be interrelated (e.g., state and zip code), so certain rules must be implemented. In order to address all the nuances associated with the forms/entries used by merchants, a more sophisticated payments catalog that provides the flexibility to serve a broad range of clients is needed.

Figure 3:
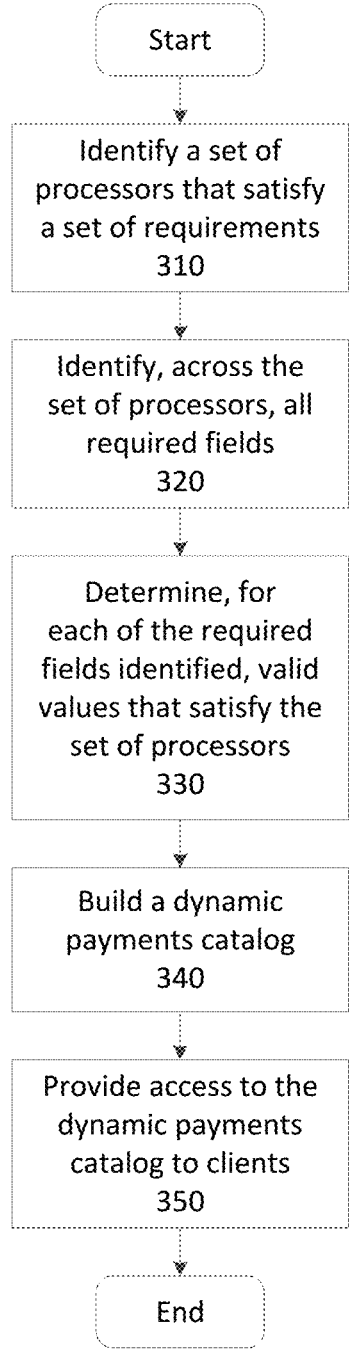
FIG. 3 illustrates an exemplary process 300 for implementing a dynamic payments catalog.

FIG. 3 illustrates an exemplary process 300 for implementing a dynamic payments catalog. In step 310, a set of processors that satisfies a set of requirements is identified. In an exemplary embodiment, each processor has a corresponding tuple (i.e., a list) that defines the capabilities of the processor. The tuple, for example, may provide an indication of what functions the processor can perform, what location (s) the processor may be able to perform these functions, etc.

Using vacation rentals as an example business vertical, the identification determines which processors may be used by a company that provides vacation rental services that link renters and owners. In other words, the set of processors may be identified based on their capability to transact payments between renters and owners of the properties. If, for example, the proposed system is to deal with vacation rentals offered in Canada, then the identification will choose payment processors that, as indicated by their tuples, are allowed to process transactions within Canada. That set of payment processors may further be reduced to those that can support the local currency (i.e., Canadian dollars). In some embodiments, the set of processors may additionally be reduced to those that can support some combination of specific transaction networks, such as credit cards, debit cards, local clearing networks, wires, cash pickups, among others.

As demonstrated by this example, the set of processors may be reduced based on capabilities, regulatory restrictions as well as other factors. While the processors have, for the most part, standardized documents (e.g., name, address, phone number, etc.) that are similar/universal, certain differences between them may nonetheless exist. In order to account for the differences, once the reduced set is identified, all required fields across the set of processors are further identified in step 320. That is, each of the set of processors have multiple fields that are required—some that are standard and others that are not. By identifying all the required fields across every single processor, a universe of potentially necessary fields can be established. For example, all processors will likely require name fields (i.e., first and last names) as well as address and phone number fields. However, not all processors may require a phone number, initials, middle name, gender, a government issued identifier (e.g., social security number in the U.S.A., as well as a host of others. That being said, if at least one of the processors from the reduced set requires a particular field, that field will be identified. These identified fields define the all possible fields for the dynamic payments catalog.

Once all the processors and fields are identified based on the set of requirements, step 330 determines, for each of the required fields identified, valid values that satisfy the set of processors. This identification is again the intersection of all the valid values across the set of processors. Taking for example a set of identified processors being processors A, B and C, and assuming that the required field is an account number field—if processor A's tuple indicates that the account number can be 10-15 digits, processor B's tuple indicates that the account number can be 5-15 digits, and processor C's tuple indicates that the account number can be 10-20 digits, then the intersection (i.e., the valid values that are acceptable across processors A, B and C) will be an account number field with 10-15 digits.

This information is crucial for the built-in validation aspect of the catalog. That is, when an entered value is outside of the valid values (e.g., if an account number with less than 10 digits or more than 20 digits is entered), the validation check will raise a red flag. In other words, the dynamic validation on the catalog knows that the account number must be 10-15 digits long in order to support, for redundancy sake, processing for that particular country (i.e., Canada), using a particular currency (i.e., Canadian dollars), and being able to handle a specific transaction (i.e., the use of checks) using any of the processors in the identified set of processors.

In some embodiments, certain fields that aren't mandatory may be included in the catalog. These additional fields are included because these field may be crucial for future transaction processing. For example, a new processor that may be considered in the future may require one of the additional fields. Once the valid values for each of the required fields have been determined, the dynamic payments catalog is constructed in step 340. Access to the dynamic payments catalog is subsequently provided to clients in step 350.

In some embodiments, GraphQL may be used to facilitate the building of UIs with all the features by facilitating the render of drop-in components. The benefit of the drop-in component is that clients can use them to integrate directly with the GraphQL layer. One example implementation of GraphQL for building a UI is as follows. A GraphQL response provides a set of fields that represent a configuration. Each field of the set has a data type and a regular expression, e.g., a first name field has a data type of text and the regular expression provides an indication of whether i) the field is required or if it should just be present, and ii) it should be editable in the UI or not.

The determination of whether a field may be edited can be important in certain instances. For example, when a user has a wallet in Canada and an external account in China that requires a Chinese name, the user's anglicized name may not be valid with the Chinese account and thus user may be blocked from transacting money on the Chinese account. The system runs the regular expression on the Chinese account against the first name associated with the wallet, and if valid, the system will not allow you to edit the first name field because the name is assumed to be proper and thus shouldn't get altered. If, however, the first name associated with the wallet is returned as invalid, then the system may allow the user to edit the field. Once the field is edited, it may be routed for manual review, and/or additional processes may be initiated, such as a review of the identity. Furthermore, additional documentation may be requested of the user to prove his/her identity. In other words, dynamic fields that have a layer to process dynamic logic that either prevents or permits editing fields (in this case, first name field) may be used.

One benefit of the system is that by leveraging GraphQL, the system can minimize the amount of customization of code on the client side by breaking up configuration into context nodes. That way, only the nodes needed will be queried depending on the state and context of the request throughout the application lifecycle. For example, computer instructions that may be provided to a client/integrator in the form of code written in a computer interpretable language, such as JavaScript, Java, Swift, Kotlin, NodeJS, Python, Ruby, C++, among others. Once the client adds a snippet (e.g., some drop-in JavaScript code) to their site, a corresponding server can provide the regular expression to the client about what the requirements will be as well as code to handle validation locally (e.g., on the client side). Validating locally helps ensure that forms are properly filled out prior to being submitted for processing. This helps increase efficiency in the process by minimizing the number of calls that need to be made to the server for a transaction to be completed. For example, if 10 digits are required for a phone number field, the entry of anything other than 10 numerical digits will return a fault on the client side. Only when all validation faults have been addressed does the query get submitted for processing.

Another benefit is that in the event there are changes in the requirements, the changes are accounted for on the server side. As such no additional modification would be required of the client to incorporate these changes. As long as the shape of the fields aren't changed (i.e., no attributes are added or removed), the server may continue to provide the regular expressions for consumption by the client running the snippet. The same concept may carried over to mobile applications created by the client. That is, only a snippet of code would be required to be dropped into the application to provide all the functionalities described above.

FIGS. 4a and 4b each provide an example graphical representation of a client side UI on which a dynamic payments catalog is implemented. That is, the JavaScript snippet has been added to the client website, and the resulting display is shown in FIGS. 4a and 4b. In this particular example, a homeowner is being onboarded onto a vacation rental service so that the homeowner can rent out his home. In the first step, the UI requests from the homeowner a location of the home. As shown in FIG. 4a, the UI provides a first dropdown menu 410 from which a country may be selected. Since this particular vacation rental service can accommodate several different countries, it naturally must also accommodate several different currencies. Accordingly, there is a second dropdown menu 420 from which currency may be selected. In this example, when the homeowner selects "United States" as the country, the validation logic that's passed back to the browser automatically chooses U.S. dollars as the currency. This occurs because no other currency is accepted in the United States, so there would be no reason for a homeowner to choose anything other than U.S. dollars. If the homeowner were to choose something other than U.S. dollars after choosing the United States as the country, it'd likely be done by mistake. Thus, to prevent a subsequent call being made with the wrong currency selected, the validation logic may choose U.S. dollar and lock the homeowner out from choosing otherwise. This mechanism helps make the process more efficient as it prevents calls that may return errors from being made in the first place.

In some foreign countries (e.g., China, Netherlands, and the U.K.), multiple currencies may be used. Thus, if the homeowner, for instance, chooses the China in the first dropdown menu 410, the second dropdown menu 420 would not default to a currency since there are three currencies that are used in China, as shown in FIG. 4b. Instead. the homeowner is required to make a manual selection. While the validation logic can't cause an automatic selection of a specific currency since more than one is acceptable, the logic may reduce the dropdown menu to all the acceptable currencies (e.g., Chinese yuan, Hong Kong dollar, and Maccanese Pataca).

If more information is provided by the homeowner, however, the validation logic may be able to further narrow down what is to be displayed in any of the dropdown menus. Furthering the currency example above, if the homeowner were to choose China, where multiple currencies are used, as the country, and subsequently chooses Hong Kong as a region from another dropdown menu (or enters Hong Kong into a field), then the validation logic may default to Hong Kong dollar as the currency. In this instance, however, Hong Kong dollar could be defaulted to as a suggestion. In other words, while the logic may choose Hong Kong dollar, the dropdown menu 420 may still be selectable by the homeowner to choose an alternative (e.g., Chinese yuan).

As can be seen in this example, the validation logic may be used to provide some guidance to or restrict a user selection so as to minimize making calls that trigger errors. In some embodiments, the fields may be arranged in a manner so that the fields appearing most prominently (e.g., the ones shown in the top-most and or left-most position) are those that, when selected/entered, will most significantly reduce the number of options of the remaining fields. For example, the "country" field may be placed highest because once a country is selected, for example, via dropdown menu 410, then only the options that apply to the selected country for the remaining fields will be presented in the remaining dropdown menus 430.

For example, if United States is chosen as a country, then U.S. dollars will be automatically chosen as the currency, English will be automatically chosen as the language, and, in some embodiments, the address fields will be configured to require a street, a city, a state and a zip code. A unit number field may also be presented; however, an entry may not be required since not all addresses have an associated unit number. As discussed above, the validation logic may ensure that the state is entered as a two-letter string, and that the zip code is entered as a five-number string. Additionally, a phone number field designed to accept a U.S. phone number (e.g., three-digit zip code and a seven-digit number) may be presented If any of the entries into these fields is determined to be improper by the validation logic, a red flag may be presented and the user may be blocked from submitting the form until the problem is corrected. As described above, the validation is accomplished on the client side so as to not create a load on a server until all the proper information has been provided.

The dynamic payments catalog described above is able to provide various payment methods/systems based on certain selections/entries provided by the user. Clients may use this catalog to build their own products (e.g., websites). Furthermore, a catalog of UIs may be built by the clients. This construction is driven by exposing an architecture via GraphQL interface. That is, any client can use JavaScript to get a GraphQL response and render the information in a UI. This architecture can efficiently handle queries by using a layer that can combine queries. Thus, UIs for clients are easily customizable.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for implementing a dynamic payments catalog, the system comprising:
   a non-transitory memory storing instructions; and
   one or more hardware processors coupled to the non-transitory memory and configured to read the instructions from the non-transitory memory to cause the system to perform operations comprising:
      identifying, from a group of payment processors, a set of different payment processors that satisfy a set of requirements for the dynamic payment catalog;
      identifying a set of required fields that are required by one or more of the set of different payment processors, wherein a particular required field, of the set of required fields, is required by both first and second payment processors of the set of different payment processors;
      determining, for the particular required field, a corresponding range of valid data values that satisfy conditions imposed by the first and second payment processors, wherein, the determining includes:
         based on a first condition imposed by the first payment processor, identifying a first range of data values that are accepted, by the first payment processor, for the particular required field;
         based on a second condition imposed by the second payment processor, identifying a second range of data values that are accepted, by the second payment processor, for the particular required field;

selecting an intersection of the first and second ranges of data values as the corresponding range of valid data values that are accepted, for the particular required field, by both the first and second payment processors;

building the dynamic payments catalog based on the set of required fields, wherein the dynamic payments catalog includes validation logic that is usable, by a client system of a client, to locally verify that a user-submitted value for the particular required field is within the corresponding range of valid data values that are accepted by both the first and second payment processors;

providing access to the dynamic payments catalog to the client based on a code snippet included in client-side code by the client to invoke the dynamic payments catalog;

updating, based on communication with one or both of the first and second payment processors, the range of valid data values for the particular required field that are accepted by both the first and second payment processors; and sending information indicating the updated range of valid data to the client system, wherein the information is usable, by the client system, to enforce the updated range of valid data for the dynamic payments catalog without updating the code snippet.

2. The system of claim 1, wherein the operations further comprise:
accessing processor information corresponding to the group of payment processors, wherein the processor information includes, for a given one of the set of different payment processors, a tuple that defines capabilities of the given payment processor, wherein the identifying the set of different payment processors is performed based on the processor information.

3. The system of claim 2, wherein the tuple provides an indication of functionality of the given payment processor.

4. The system of claim 1, wherein the conditions are based on at least one of a length of a string of characters, types of characters in the string of characters, and a format of the string of characters.

5. The system of claim 1, wherein the intersection of the first and second ranges represents a least-restrictive combination of the first and second ranges.

6. A method for implementing a dynamic payments catalog, the method comprising:
identifying, by a computing system from a group of payment processors, a set of different payment processors that satisfy a set of requirements for the dynamic payment catalog;
identifying, by the computing system, a set of required fields that are required by one or more of the set of different payment processors, wherein a particular required field, of the set of required fields, is required by both first and second payment processors of the set of different payment processors;
determining, by the computing system for the particular required field, a corresponding range of valid data values that satisfy conditions imposed by the first and second payment processors, wherein the determining includes:
based on a first condition imposed by the first payment processor, identifying a first range of data values that are accepted, by the first payment processor, for the particular required field;
based on a second condition imposed by the second payment processor, identifying a second range of data values that are accepted, by the second payment processor, for the particular required field; and
selecting an intersection of the first and second ranges of data values as the corresponding range of valid data values that are accepted, for the particular required field, by both the first and second payment processors;

building, by the computing system, the dynamic payments catalog based on the set of required fields, wherein the dynamic payments catalog includes validation logic that is usable, by a client system of a client, to locally verify that a user-submitted value for the particular required field is within the corresponding range of valid data values that are accepted by both the first and second payment processors;

providing, by the computing system, access to the dynamic payments catalog to the client based on a code snippet included in client-side code by the client to invoke the dynamic payments catalog;

updating, by the computing system based on communication with one or both of the first and second payment processors, the range of valid data values for the particular required field that are accepted by both the first and second payment processors; and sending, by the computing system to the client system, information indicating the updated range of valid data, wherein the information is usable, by the client system, to enforce the updated range of valid data for the dynamic payments catalog without updating the code snippet.

7. The method of claim 6, wherein the identifying the set of different payment processors is performed based on processor information that includes, for a given one of the set of different payment processors, a tuple that defines capabilities of the given payment processor.

8. The method of claim 7, wherein the tuple provides an indication of functionality of the given payment processor.

9. The method of claim 7, wherein the conditions are based on at least one of a length of a string of characters, types of characters in the string of characters, and a format of the string of characters.

10. The method of claim 7, wherein the intersection of the first and second ranges represents a least-restrictive combination of the first and second ranges.

11. A non-transitory machine-readable medium having stored thereon machine-readable instructions executable to cause performance of operations comprising:
identifying, from a group of payment processors, a set of different payment processors that satisfy a set of requirements;
identifying a set of required fields that are required by one or more of the set of different payment processors, wherein a particular required field, of the set of required fields, is required by both first and second payment processors of the set of different payment processors;
determining, for the particular required field, a corresponding range of valid data values that satisfy conditions imposed by the first and second payment processors, wherein the determining includes:
based on a first condition imposed by the first payment processor, identifying a first range of data values that are accepted, by the first payment processor, for the particular required field;
based on a second condition imposed by the second payment processor, identifying a second range of data values that are accepted, by the second payment processor, for the particular required field; and selecting an intersection of the first and second ranges of data values as the corresponding range of valid data values that are accepted, for the particular required field, by both the first and second payment processors;

building a dynamic payments catalog based on the set of required fields, wherein the dynamic payments catalog includes validation logic that is usable, by a client system of a client, to locally verify that a user-submitted value for the particular required field is within the corresponding range of valid data values that are accepted by both the first and second payment processors;

providing access to the dynamic payments catalog to the client based on a code snippet included in client-side code by the client to invoke the dynamic payments catalog;

updating, based on communication with one or both of the first and second payment processors, the range of valid data values for the particular required field that are accepted by both the first and second payment processors; and sending information indicating the updated range of valid data to the client system, wherein the information is usable, by the client system, to enforce the updated range of valid data for the dynamic payments catalog without updating the code snippet.

12. The non-transitory machine-readable medium of claim 11, wherein the identifying the set of different payment processors is performed based on processor information that includes, for a given one of the set of different payment processors, a tuple that defines capabilities of the given payment processor.

13. The non-transitory machine-readable medium of claim 12, wherein the tuple provides an indication of functionality of the given payment processor.

14. The non-transitory machine-readable medium of claim 11, wherein the conditions are based on at least one of a length of a string of characters, types of characters in the string of characters, and a format of the string of characters.

15. The non-transitory machine-readable medium of claim 11, wherein the intersection of the first and second ranges represents a least-restrictive combination of the first and second ranges.

16. The method of claim 6, wherein the dynamic payments catalog is operable to integrate with a user interface of one or more web pages hosted by the client system, and wherein the validation logic further includes one or more rules operable to guide a selection, by a user accessing the one or more web pages, of data values for one or more of the set of required fields via the user interface.

17. The method of claim 16, wherein, to guide the selection of the data values for the one or more of the set of required fields, the one or more rules are operable to determine, based on a first user-submitted value for a first one of the set of required fields, a restricted set of available data values to present, to the user via the user interface, for a second one of the set of required fields.

18. The method of claim 16, wherein the dynamic payments catalog utilizes the GraphQL application programming interface architecture.

19. The non-transitory machine-readable medium of claim 11, wherein the dynamic payments catalog is operable to integrate with a user interface of one or more web pages hosted by the client system, and wherein the validation logic further includes one or more rules operable to guide a selection, by a user accessing the one or more web pages, of data values for one or more of the set of required fields via the user interface.

20. The non-transitory machine-readable medium of claim 19, wherein, to guide the selection of the data values for the one or more of the set of required fields, the one or more rules are operable to determine, based on a first user-submitted value for a first one of the set of required fields, a restricted set of available data values to present, to the user via the user interface, for a second one of the set of required fields.

* * * * *